United States Patent
Maxson

[11] Patent Number: 6,116,269
[45] Date of Patent: Sep. 12, 2000

[54] SOLENOID PRESSURE TRANSDUCER

[75] Inventor: William R. Maxson, Shelby, N.C.

[73] Assignee: Fasco Controls Corporation, Shelby, N.C.

[21] Appl. No.: 09/111,013

[22] Filed: Jul. 7, 1998

[51] Int. Cl.[7] .................................................. G05D 16/20
[52] U.S. Cl. ........................................ 137/487.5; 137/557
[58] Field of Search ................................ 137/487.5, 557

[56] References Cited

U.S. PATENT DOCUMENTS

| | | |
|---|---|---|
| 3,270,768 | 9/1966 | Kamowski . |
| 3,286,726 | 11/1966 | Guy . |
| 3,288,165 | 11/1966 | Cranage . |
| 3,292,651 | 12/1966 | Innocenti . |
| 3,297,048 | 1/1967 | Imhof . |
| 3,311,125 | 3/1967 | Beasley . |
| 3,511,273 | 5/1970 | Bartholomäus . |
| 3,865,142 | 2/1975 | Begun et al. . |
| 3,874,403 | 4/1975 | Fischer . |
| 3,921,666 | 11/1975 | Leiber . |
| 4,150,686 | 4/1979 | El Sherif et al. . |
| 4,174,729 | 11/1979 | Roark et al. . |
| 4,488,574 | 12/1984 | Bartholomaus ...................... 137/487.5 |
| 4,553,564 | 11/1985 | Baram . |
| 4,612,227 | 9/1986 | Lam et al. . |
| 4,648,425 | 3/1987 | Watanabe et al. . |
| 4,662,540 | 5/1987 | Schroter . |
| 4,665,754 | 5/1987 | Glenn et al. . |
| 4,687,021 | 8/1987 | Ise et al. . |
| 4,747,425 | 5/1988 | Lauer . |
| 4,796,661 | 1/1989 | Hishinuma et al. . |
| 4,840,195 | 6/1989 | Zabrenski . |
| 4,860,787 | 8/1989 | Grosselin ............................. 137/487.5 |
| 4,872,483 | 10/1989 | Shah . |
| 5,116,331 | 5/1992 | Chapman . |
| 5,301,781 | 4/1994 | Tischer et al. ................... 137/487.5 X |

FOREIGN PATENT DOCUMENTS

| | | |
|---|---|---|
| 2 233 166 | 8/1987 | European Pat. Off. . |
| 0 357 964 | 3/1990 | European Pat. Off. . |

*Primary Examiner*—Gerald A. Michalsky
*Attorney, Agent, or Firm*—Wolf, Greenfield & Sacks

[57] ABSTRACT

A solenoid pressure transducer for measuring and controlling pressure within a system includes pressure sensing technology incorporated into a solenoid valve such that a common pressure chamber is used to sense pressure of a fluid and to control the flow of the same fluid. A solenoid sleeve forms the pressure chamber and a sensing element attached to the sleeve is used to measure pressure within the sleeve. The pressure measurement is then used by the solenoid sleeve to control the position of the solenoid valve.

12 Claims, 8 Drawing Sheets

SOLENOID PRESSURE TRANSDUCER

FIELD OF THE INVENTION

The present invention relates generally to pneumatic and hydraulic control systems and more particularly to systems requiring both a solenoid valve and a pressure sensor or transducer.

BACKGROUND OF THE INVENTION

Solenoid valves are used to control a flow of fluid (e.g., air, liquid or gas) within a system such as an air conditioning, hydraulic brake, or fuel system. A solenoid valve opens and closes flow passages by energizing a coil to produce a magnetic field which in turn, moves an internal armature.

A pressure sensor or transducer is used to monitor fluid pressure within a system, such as a pneumatic or hydraulic system. As used herein, a pressure transducer includes both a pressure transducer and a pressure sensor. Generally, the measured pressure information is provided to an electrical control unit (ECU) located externally to a solenoid valve and which activates or deactivates (opens or closes) the solenoid valve based on the pressure information. There are several types of technology employed for pressure sensors and transducers which include, but are not limited to, ceramic, resistive, linear variable differential transformer (LVDT), piezoresistive, and piezoelectric. One common form of sensing pressure in automotive applications utilizes capacitive type sensors; however, these sensors require large volumes of space to house the sensing element and electronics.

In an effort to improve efficiencies, reduce costs, and miniaturize package size, system designers often try to eliminate components while still maintaining the same or an improved level of performance. In conventional systems, a discrete pressure sensor can be added to an existing solenoid valve body or housing. However, in such a system, the overall packaging of the combination device is quite large and does not integrate them into one unit. Also, combining two or more devices does not eliminate leak paths in the system.

A solenoid valve and a pressure transducer can be used to monitor and control the same types of fluid pressure; combining these two discrete components into one device would add value to a system. What is needed is an integrated solenoid pressure transducer that will provide an efficient method of incorporating pressure-sensing technology within an original envelope (housing) of a solenoid valve, and preferably provide a common electrical connection point. In addition, the integrated solenoid pressure transducer should preferably be easy and inexpensive to manufacture based on structural simplicity and the use of inexpensive materials.

SUMMARY OF THE INVENTION

The present invention is directed to an integrated solenoid pressure transducer for measuring and controlling pressure within a system. The solenoid pressure transducer includes a pressure sensor incorporated into a solenoid valve assembly; more specifically, common pressure chamber is used both to sense pressure of a fluid (e.g., air, liquid, or gas) and to control the flow of the same fluid.

In one embodiment, pressure sensing is performed by a silicon die having an embedded resistive element such as a Wheatstone bridge. The die is attached to a solenoid sleeve which forms the common pressure chamber. The silicon die may be attached to the closed end of the sleeve with a vitreous glass or other bonding agent.

In certain preferred embodiments, the sleeve is made of a non-magnetic material, such as Inconel 600/601 or Nickel 200/201, and is deep-drawn and fully annealed. Preferably, the sleeve has a coefficient of thermal expansion of $7.4 \times 10^{-6}$ in/in/° F. or less for compatability with the silicon die.

These and other features of the invention will be more specifically understood from the following detailed description and drawings.

BRIEF DESCRIPTION OF THE DRAWINGS

FIG. 1b is a side view of the housing, with dimensions, of the solenoid valve of FIG. 1a;

FIG. 2b is a side view of the housing, with dimensions, of the pressure sensor of FIG. 2a;

FIG. 2c is an end view of the housing, with dimensions, of the pressure sensor of FIG. 2a;

FIG. 2d is an exploded parts view of the pressure sensor of FIG. 2a;

DETAILED DESCRIPTION OF THE INVENTION

According to one aspect of the invention, an integrated solenoid pressure transducer is provided which includes a pressure sensing device attached to one end of a sleeve, the sleeve forming a pressure chamber common to both the solenoid valve and the pressure transducer. For ease of comparison, the prior art discrete pressure transducer and discrete solenoid valve will first be described.

Figure 1A:
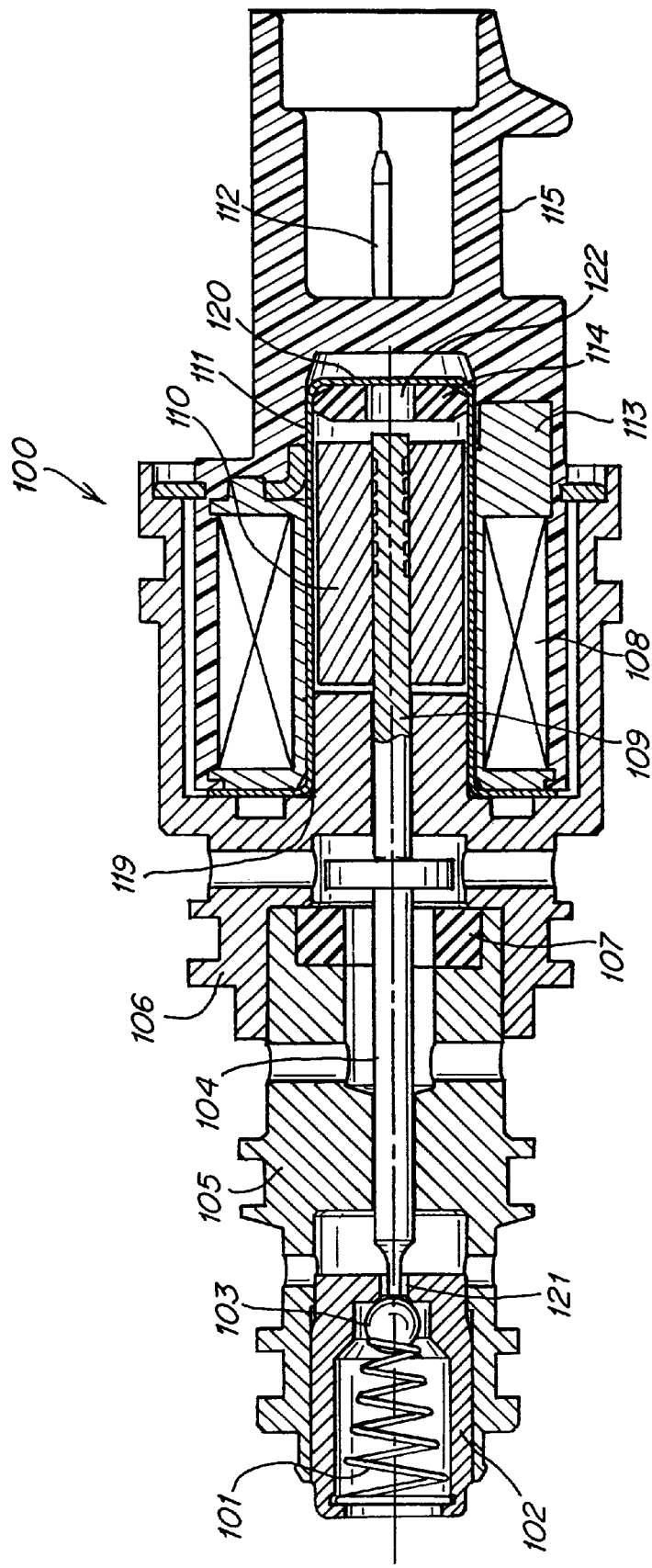
FIG. 1a is a cross sectional view of a prior art discrete solenoid valve.

FIG. 1a illustrates a prior art solenoid valve 100 commonly used in automotive applications for controlling pressure of a fluid (e.g., air, liquid or gas). An outer housing 106 shown in FIG. 1 a surrounds a solenoid assembly which includes an armature 110, rod 109 and a coil assembly. The coil assembly includes a cylindrical solenoid sleeve 111 having an open end 119 and a closed end 120, an impact disc 114 inside the closed end of the sleeve, a coil 108 surrounding the sleeve, a bobbin 113 outside the closed end of the sleeve, and electrical terminals 112 within a connector body 115 extending from the closed end of the sleeve. The solenoid sleeve 111 acts as a guide for the armature 110 and rod 109, which are press fit together. Rod 109 is connected to a pin 104 which is surrounded by a rubber impact seat 107 and disposed within the sleeve; the rod is axially movable in the cylindrical sleeve. The inside of the solenoid sleeve 111 is exposed to a system pressure during certain operating modes and thus serves as a pressure chamber. The system fluid acts against a ball 103, positioned upstream from the open end of the sleeve. The ball 103 is pushed to the right (downstream) by a spring 101, in order to close an orifice 121 in seat 102.

In operation, a system fluid enters into seat 102 from a fluid source (not shown) and applies pressure to ball 103. Meanwhile, coil 108 has been activated by a voltage applied to terminals 112, and coil 108 creates a magnetic force which is applied to rod 109 by armature 110. The left-directed axially applied magnetic force causes rod 109 to push pin 104 (to the left) which in turn, pushes ball 103 (to the left). This movement breaks the seal between ball 103 and seat 102 and opens the orifice 121. The fluid then enters into the valve body 105; it travels around pin 104, through impact seat 107, into housing 106 and continues around rod 109 in sleeve 111 and through a central hole in the impact disc 114; to the closed end 120 of the solenoid sleeve 111. When the voltage is reduced or removed from coil 108, the left-directed force is reduced or removed from rod 109 and the rod moves back to the right; as a result, spring 101 pushes ball 103 inside seat 102 and seals off the orifice 121 in valve body 105, thereby cutting off the flow of fluid to and reducing the pressure inside solenoid sleeve 111.

Returning to the operational mode wherein pressure is applied (by entry of the system fluid) to the pressure chamber, i.e., the inside of the sleeve 111, the closed end 120 of the sleeve flexes due to the pressure and thus acts like a diaphragm. An appropriate thickness for the closed end 120 of the sleeve 111 is selected to respond to the system pressures at issue. For best performance of the valve, the sleeve material should be non-magnetic. A sleeve constructed from a magnetic material causes the magnetic flux produced by the energized coil 108 to by-pass the armature 110 and thus reduces any resultant force applied by armature 110 to rod 109.

Figure 1B:
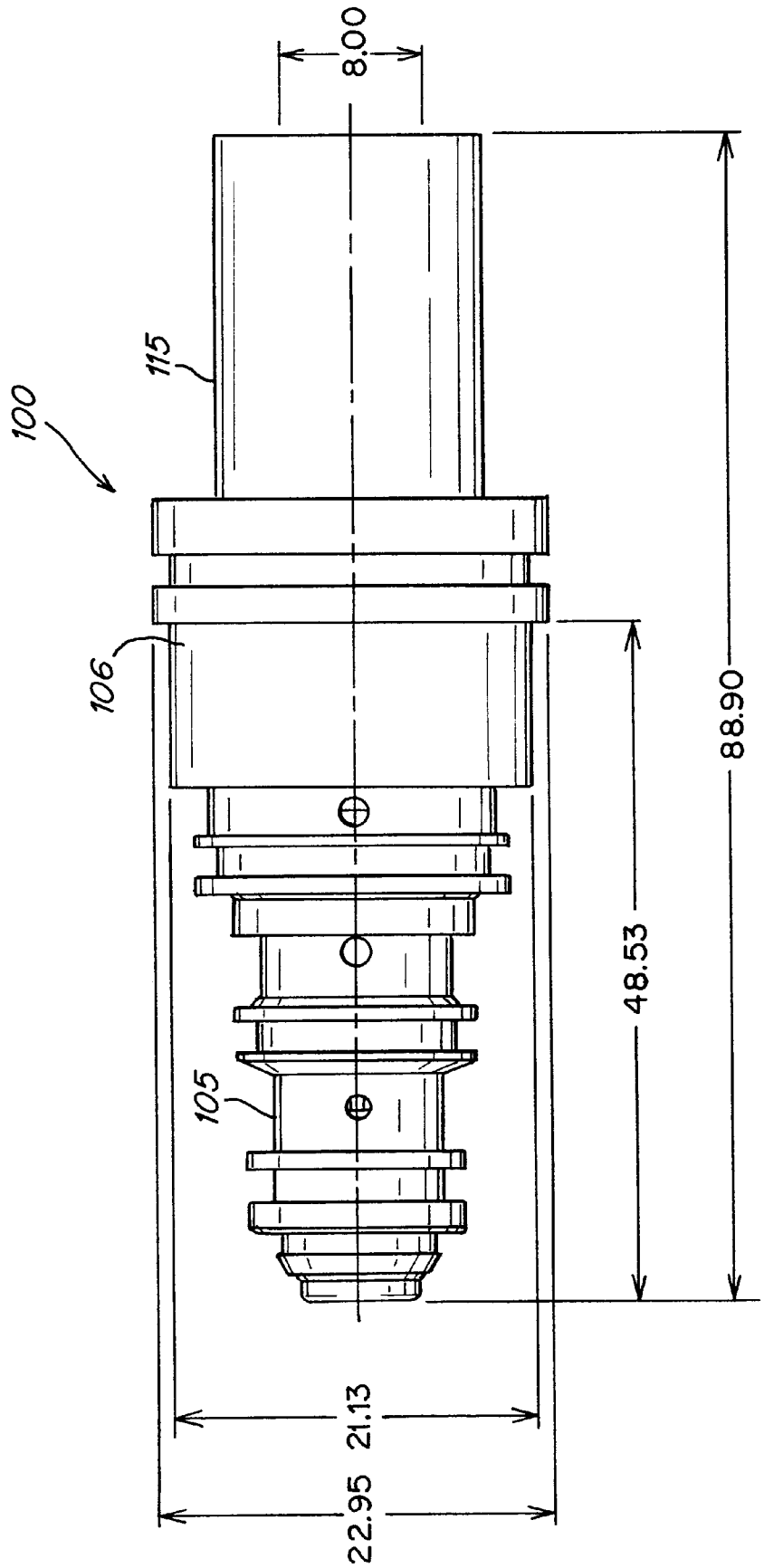

FIG. 1b is an outer view of the overall valve housing with dimensions; it will be discussed below in regard to the reduction in size of the combined solenoid pressure sensor of this invention.

Figure 2A:
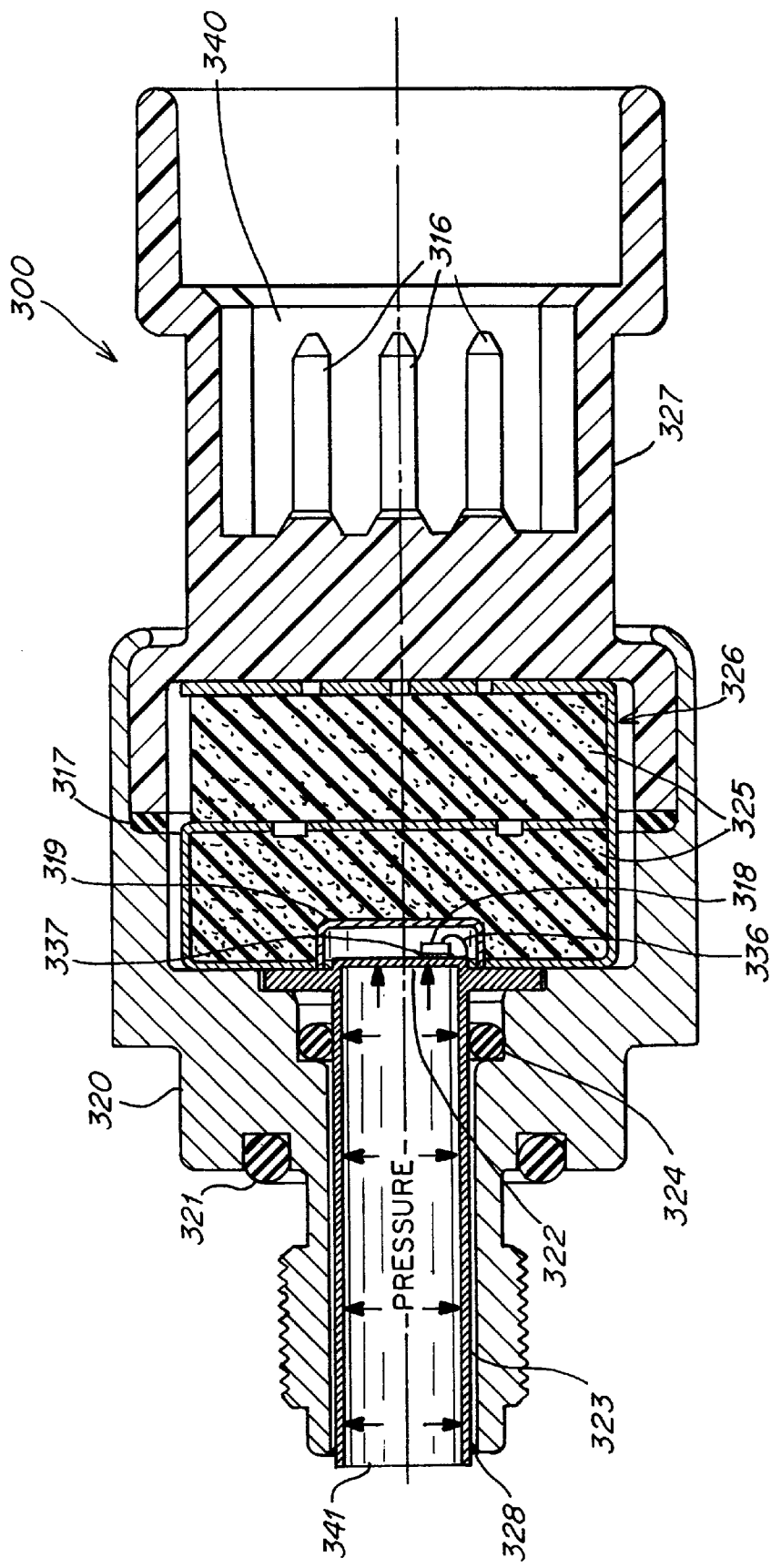
FIG. 2a is a cross sectional view of a prior art discrete pressure sensor.
Figure 2C:
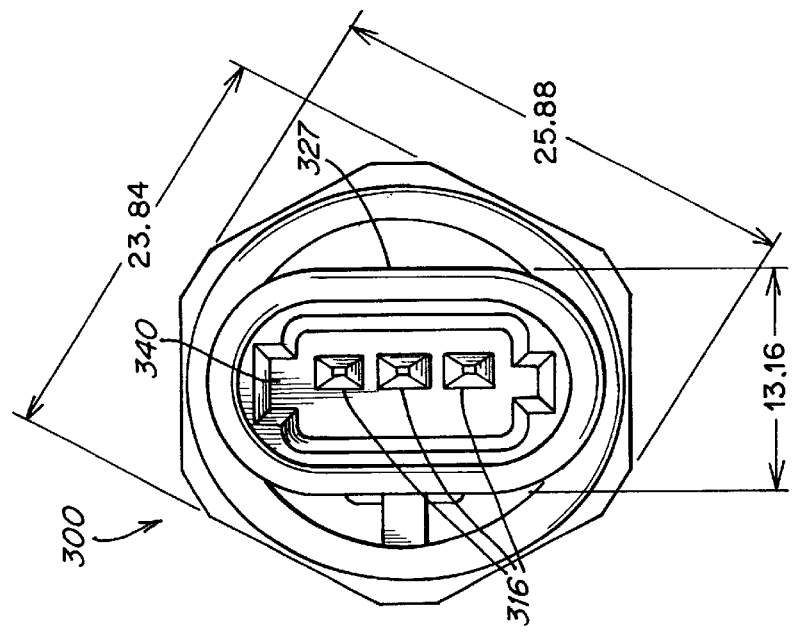
Figure 2B:
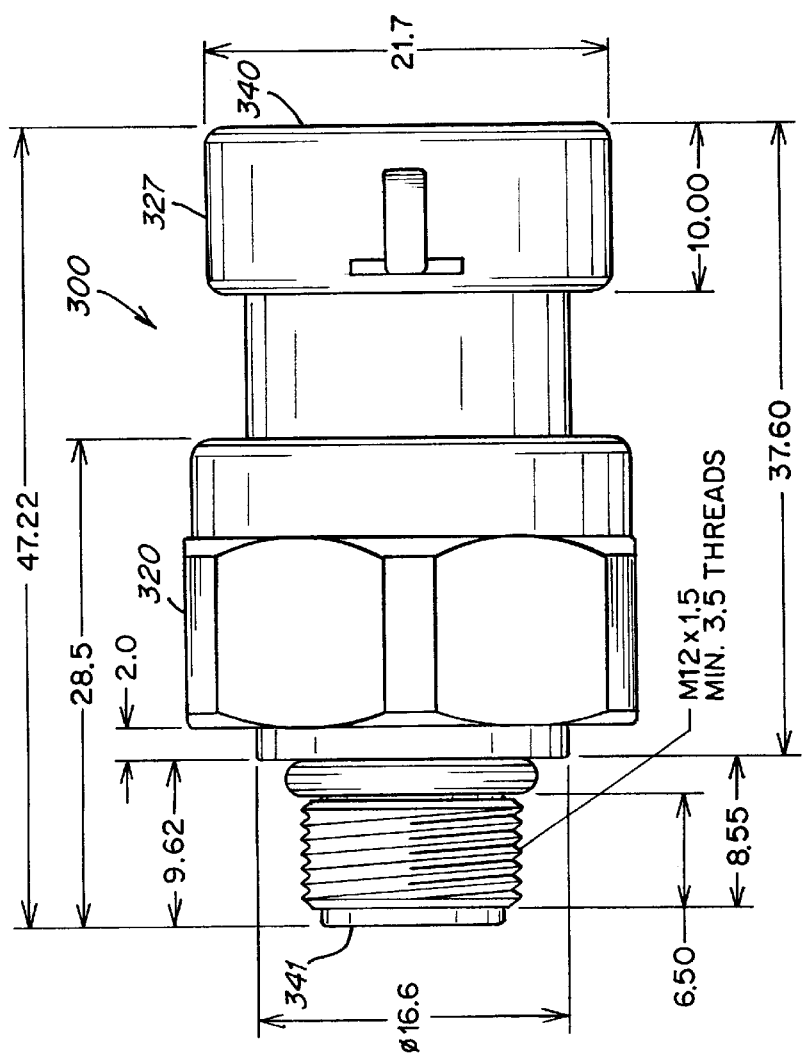
Figure 2D:
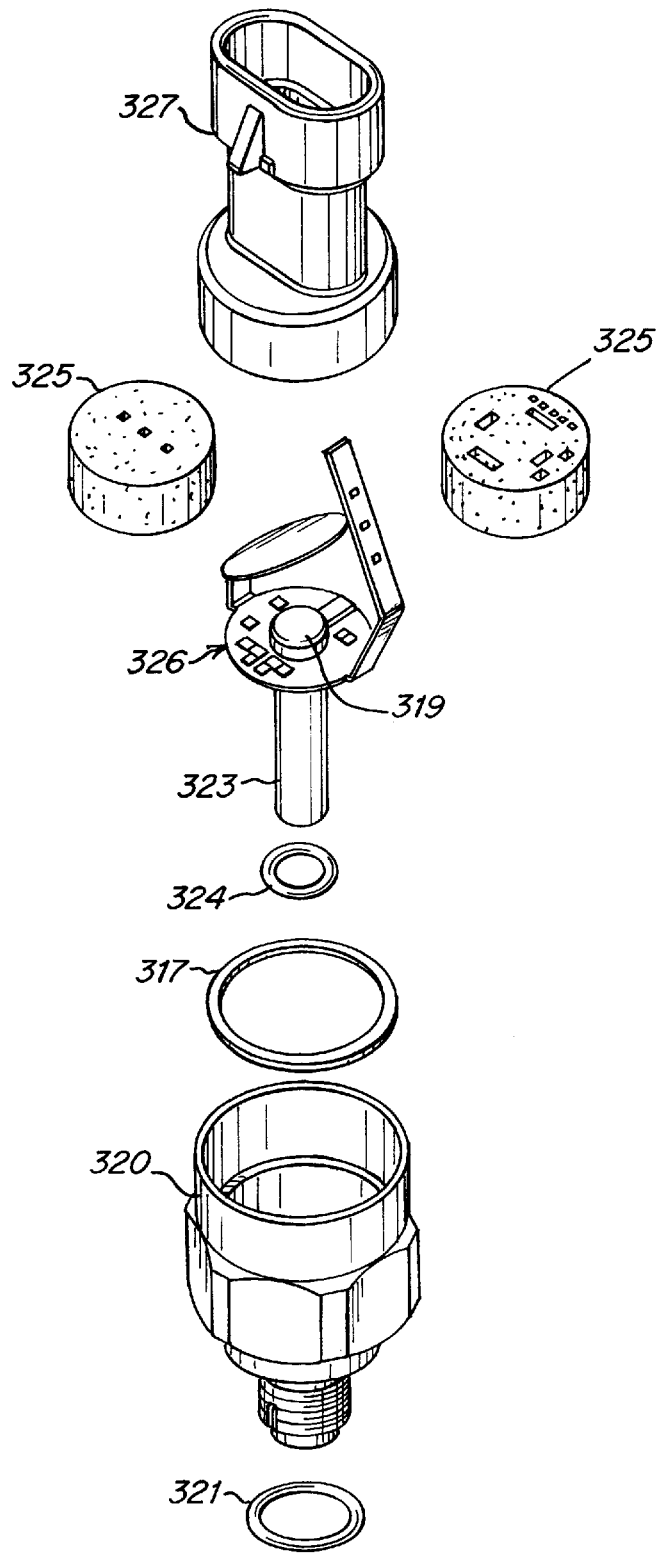

FIGS. 2a–2d illustrate one example of a prior art piezoresistive pressure sensor 300 commonly used in automotive applications. FIG. 2d is an exploded parts view of the pressure sensor of FIG. 2a.

The pressure sensor of FIG. 2a includes a set of electrical terminals 316 extending from a receptacle 340 at one end of a connector assembly 327. The other end of connector assembly fits within the right end of housing 320 and is held in place by gasket 317; housing 320 includes a right hand inlet 341 for the system fluid (to be measured) and encloses the sensing element. The inlet comprises the open end of an elongated metal pressure tube 323; which forms a pressure chamber. The opposite end of tube 323 is closed and forms a movable diaphragm 322 responsive to changes of pressure in tube 323. A silicon die sensing element 318 is attached by glass bond 337 to the other side of the diaphragm for measuring the pressure of the fluid in tube 323. Weld 328 and internal o-ring 324 holds the pressure tube in position in housing 320. External o-ring 321 enables the housing 320 to be attached to a system fluid source, whereby the system fluid enters inlet 341 of pressure tube 323.

More specifically, the sensor includes a flex circuit assembly 326 connected to silicon die 318 by wire bonds 336; the flex circuit 326 is attached to electrical connectors 316. A protective cap 319 surrounds the die 318 and a sponge 325 surrounds the cap 319 for further protection and vibration and shock dampening.

In operation, system fluid enters through the open end 341 of pressure tube 323 and causes diaphragm 322 at the opposite end to flex. This flexing produces a strain on the opposite (rearside) of diaphragm 322. Silicon die 318 is attached to the rearside of diaphragm 322 with a bonding agent such as vitreous glass 337. Silicon die 318 includes an embedded resistive element for measuring strain, namely a Wheatstone bridge. The resistance in the Wheatstone bridge changes proportionally with the change in the strain in the silicon die 318 to produce an output voltage when a constant current is applied. The current and voltage are applied to the bridge by terminals 316.

The output voltage from the bridge is proportional to the strain in the die 318 which, in turn, is proportional to the pressure inside pressure tube 323. The output voltage is defined by Ohm's law: V=IR, i.e., the voltage is proportional to the current multiplied by the resistance. The current (I) through silicon die 318 is constant, thus the voltage (V) is directly proportional to the resistance (R) of the bridge.

The output voltage signal is compensated for temperature and linearity variations and amplified by the flex circuit assembly 326, the assembly includes surface-mounted electrical components. The output voltage signal is carried by one or more of the terminals 316 to an electrical control unit (ECU) located outside of the pressure sensor (not shown).

In order for the sensor to function properly within a wide range of temperatures (e.g., −50 to 150° C.) the material of pressure tube 323 should preferably have a low coefficient of thermal expansion (CTE) (e.g., $7.4 \times 10^{-6}$ in/in/° F. or less). This low CTE is used because the silicon die 318 typically has such a low CTE. As the difference in the CTE between the two materials increases, the vitreous glass bond 337 may not withstand the strain and may crack or pop off of the pressure tube 323.

Vitreous glass is often used as a bonding agent because of its resistance to dimensional change in conditions of high temperature and/or stress. A change in dimensions of the bonding agent may cause the sensor to lose calibration. While vitreous glass is thus preferred, other bonding agents may be used.

Figure 3A:
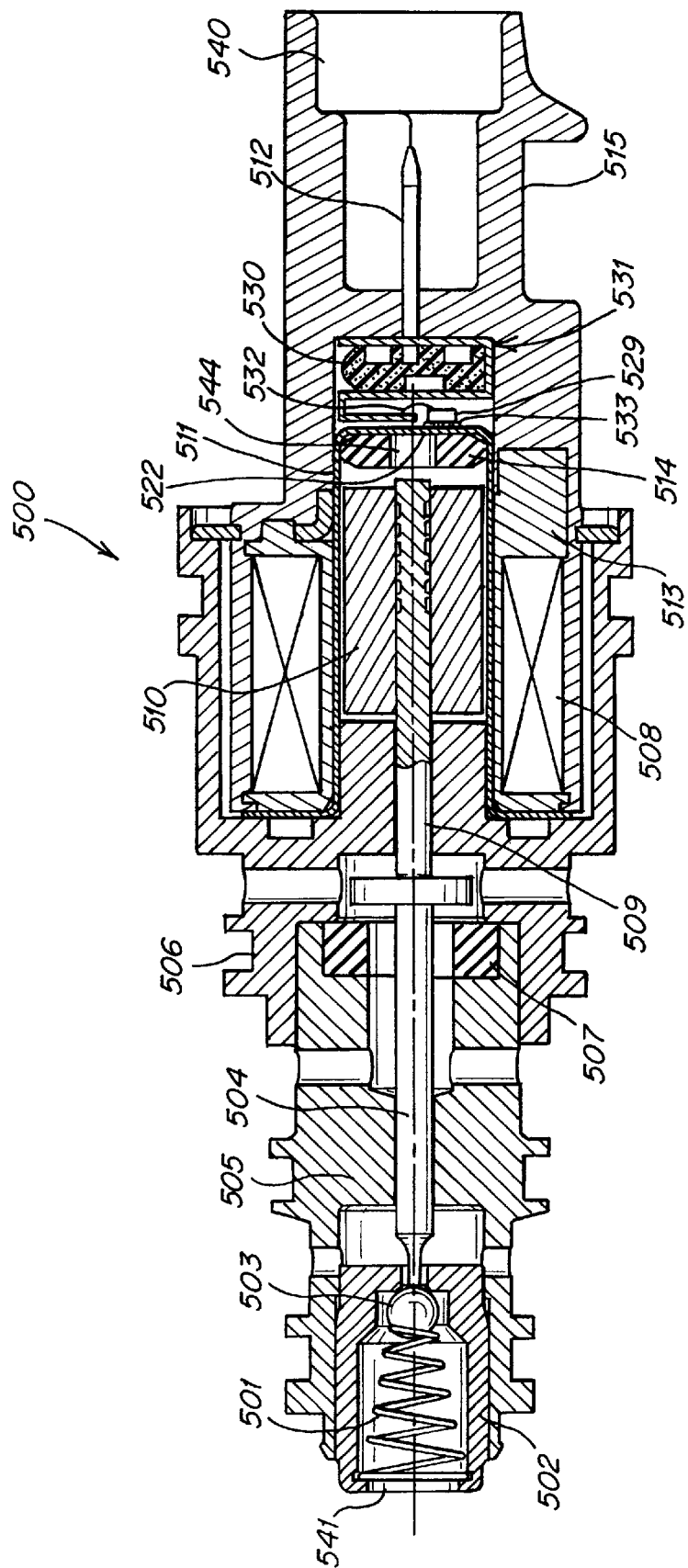
FIG. 3a is a cross sectional view of an integrated solenoid pressure transducer according to one embodiment of the present invention.

FIG. 3a illustrates an integrated solenoid pressure transducer according to one embodiment of the invention. The integrated device incorporates a pressure sensing technology similar to that shown in FIG. 2a into a solenoid valve similar to that shown in FIG. 1a, in order to provide a single device for measuring and controlling pressure. A solenoid sleeve (e.g., sleeve 111 in FIG. 1a) is similar in physical structure to a pressure tube (e.g., tube 323 in FIG. 2a) in a pressure sensor. In accordance with the present invention, by attaching a pressure sensing element to the closed end of the solenoid sleeve, the sensing element can measure the strain of the solenoid sleeve—similar to the measurement of strain in the diaphragm of the pressure sensor. This strain can be converted to a voltage signal which is proportional to the strain. The output voltage signal thus provides a voltage that is proportional to the system pressure and can be used to control the system pressure.

Thus, in the integrated sensor of FIG. 3a, in addition to the parts discussed above in connection with FIG. 1 (corresponding elements in FIG. 3a have a 500 series reference number), the elements used for pressure sensing are included within the solenoid device. These elements include sponge 530, wire bond 532, glass bond 533, silicon die 529, and flex circuit assembly 531. Silicon die 529 (the sensing element) has an embedded Wheatstone bridge although other resistive elements may be used. A suitable silicon die is available from Sensym of Milpitas, Calif., or Motorola of Schaumberg, Ill.

The combined device in FIG. 3a includes five terminals 512 having a common connection point formed by receptable 540 in connector body 515. In this embodiment, two terminals connect to the solenoid valve—one to apply voltage to the coil 508 and one connected to ground, and three terminals connect to the pressure sensing technology—one to supply an input voltage to the flex circuit 531, one connected to ground and one providing an output voltage from the flex circuit.

In operation, system fluid enters seat 502 via inlet 541 and applies a right directed pressure to ball 503. When coil 508 is activated by voltage from the terminals 512, a left directed magnetic force is applied to rod 509 by armature 510. Rod 509 moves to the left and pushes on pin 504 which pushes on ball 503. Depending on the balance of forces, this breaks the seal between ball 503 and seat 502. This allows the system fluid to enter into the valve body 505, travel around pin 504 and continue around rod 509 through the hole 544 in the impact disc 514 at the closed end of sleeve 511. The diaphragm 522 on the closed end of sleeve 511 is flexed, producing strain on the rear surface of diaphragm 522. In this embodiment, silicon die 529 is attached to diaphragm 522 with vitreous glass 533 on the rear side of the diaphragm (opposite the surface exposed to the system pressure). In another embodiment, a sensing element, such as silicon die 529, may be attached to any location on solenoid sleeve 111 which allows the die 529 or other sensing element to sense the strain on sleeve 111. Silicon die 529 is strained by the diaphragm and produces a voltage, which is proportional to the strain, which, in turn, is proportional to the pressure inside sleeve 511. Ohm's Law, V=IR, describes this voltage change. The current through die 529 is constant thus the output voltage (V) is directly proportional to the resistance (R) change of the Wheatstone bridge (due to the strain). The output voltage signal is compensated for temperature and linearity and is amplified by the flex circuit assembly 531; flex circuit 531 contains surface-mounted electrical components and integrated circuits. A bobbin 513 supports one end of flex circuit assembly 531. The opposite end of the flex circuit 531 is attached to the terminals 512. The signal from flex circuit 531 is carried to an ECU via the terminals 512. Power is supplied to the circuit through one of the terminals 512. A sponge(s) 530 is placed between the lobe(s) of the flex circuit assembly 531 to protect the electrical components from vibration and shock.

When voltage is removed from coil 508, the magnetic force is removed from rod 509 and the rod moves back to the right. Spring 501 pushes ball 503 to the right inside seat 502 and seals off the valve. The pressure is therefore removed from diaphragm 522; this reduces the strain die 529 and reduces the resistance in the embedded Wheatstone bridge.

In one embodiment, the pressure sensing technology is piezoresistive. The die, when strained, produces a millivolt output due to a resistance change of the Wheatstone bridge. The size of the die may be small (e.g., 0.020" square and 0.002" thick), which allows for extremely small device sizes.

The use of ASICs and other state-of-the-art electronics allows the small pressure-sensing subassembly to be packaged inside the solenoid valve.

As described above, the solenoid sleeve provides a surface for attaching the sensing element (e.g., a silicon die). In one embodiment, the sleeve material may be a non-magnetic metal alloy such as Inconel 600/601 or Nickel 200/201, available from Ulbrich Stainless Steels and Special Metals, Inc., although other materials may also be used. Both of these materials provide three desirable characteristics for the solenoid sleeve: (1) they are non-magnetic when fully annealed; (2) they have a CTE of $7.4 \times 10^{-6}$ in/in/° F. or less; and (3) they can be deep-drawn. The annealing process removes work hardening stresses from the sleeve material. The deep-drawn manufacturing process produces a solenoid sleeve with a closed end able to flex under pressure, similar to a diaphragm. The deep-drawn manufacturing process also provides a more controlled and uniform strain throughout the solenoid sleeve. A machined sleeve may also be used. It is also desirable to use a sleeve material which has a CTE approximately equal to the value of the CTE of the silicon. The greater the difference in CTE, the greater the expansion and strain on the bonding agent used to connect the two materials.

Figure 4:
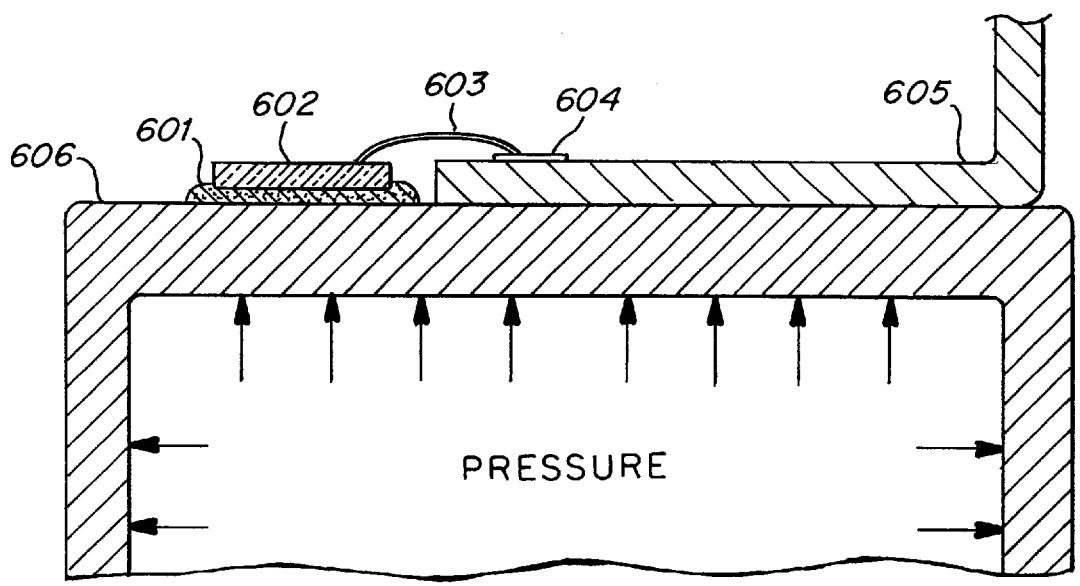
FIG. 4 is a schematic diagram of a closed end of a solenoid sleeve with an attached pressure sensing device according to one embodiment of the invention.

FIG. 4 is a schematic enlarged view of a closed end of the solenoid sleeve, according to one embodiment. Fluid pressure enters the sleeve 606 and strains the closed end of the sleeve, causing it to act like a diaphragm. A silicon die 602 is attached to the rear side of the closed end of the sleeve 606 with vitreous glass 601. Vitreous glass 601 provides a rigid bond that allows the strain in the closed end of the sleeve to be transferred to the die 602. This strain changes the resistance of the Wheatstone bridge that is embedded in the silicon die 602. This change in resistance produces a change in voltage proportional to the strain which is proportional to the fluid pressure.

In this embodiment, the Wheatstone bridge has four wire bond pads 604. Gold wire bonds 603 are attached to pads 604 which are connected electrically to the flex circuit subassembly 605. The flex circuit subassembly 605 contains an ASIC and other electrical components to amplify and correct the signal for temperature changes and non-linearity. The flex circuit 605 may be made of a Kapton substrate.

Figure 5:
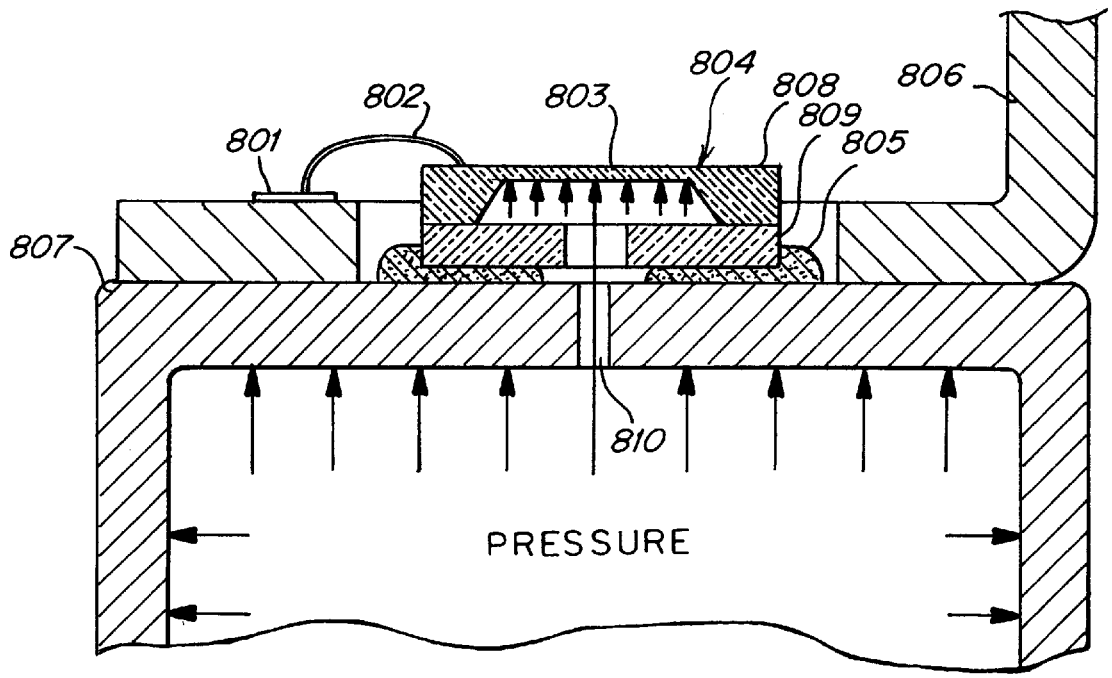
FIG. 5 is a schematic diagram of an alternate embodiment of a closed end of a solenoid sleeve with an attached pressure sensing device.

FIG. 5 is a schematic enlarged view of another embodiment using a piezoresistive micro-machined silicon die to sense pressure in the solenoid valve. In this embodiment, the closed end of the sleeve 807 has an orifice 810 that allows the fluid pressure to enter into the silicon die 804. The die is made of two silicon pieces. A top piece 808 has a reduced thickness central portion which acts as the diaphragm and includes an embedded Wheatstone bridge 803. The top piece is attached at opposing edges to a bottom die piece 809. The bottom die is attached to the sleeve 807 with a bonding agent 805. Bonding agent 805 may be a "hard" die attachment, such as solder or glass, or a "soft" die attachment, such as a room temperature vulcanizing (RTV) silicone. The embedded Wheatstone bridge 803 is attached via a wire bond 802 to gold bonding pads 801 on flex circuit 806. The fluid pressure strains the silicon die which produces a voltage signal (in the Wheatstone bridge 803) that is proportional to the fluid pressure. This embodiment allows pressure sensing for very low-pressure applications. Because the sleeve does not act as a diaphragm, the sleeve need not have a low CTE (e.g., below $7.4 \times 10^{-6}$ in/in/° F.).

Figure 3B:
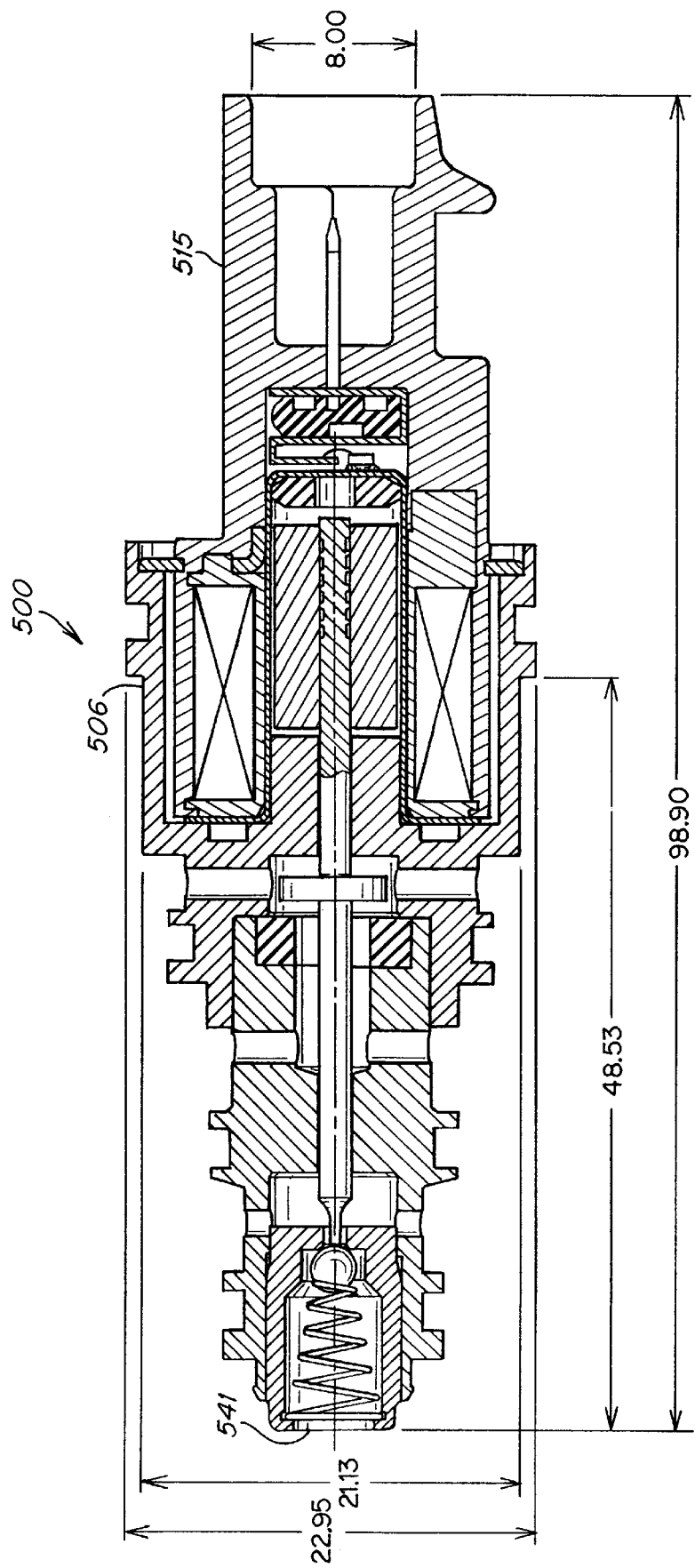
FIG. 3b is the same as FIG. 3a with dimensions shown.

One advantage of the present invention can be seen by comparing the overall dimensions of a conventional solenoid valve (FIG. 1b) and a conventional pressure sensor (FIG. 2b) with the overall dimensions of the combined solenoid pressure transducer of the present invention as shown in FIG. 3b. For example, a conventional solenoid valve may have an overall dimension of 88.90 mm×22.95 mm (FIG. 1b). A conventional pressure sensor device may, for example, have an overall dimension of 47.22 mm×25.88 mm (FIG. 2b). A prior art combined device required a housing which was essentially a combination of the housings of both discrete prior art devices. However, in the present invention, the features of both of these devices are included within the housing of a solenoid valve which in this embodiment is only slightly larger than the solenoid valve of FIG. 1b. The overall dimensions of the combined solenoid pressure transducer according to an embodiment of the present invention may be, for example 98.90 mm×22.95 mm (FIG. 3b).

Having now described certain embodiments of the invention, it will be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A solenoid pressure transducer for measuring and controlling pressure within a system comprising:

a solenoid sleeve of a nonmagnetic material enclosing a pressure chamber, the pressure chamber being in communication with a source of the system pressure;

a sensing element comprising a silicon die attached to the sleeve for measuring strain in the sleeve caused by the system pressure;

a vitreous glass bond attaching the silicon die to the sleeve; and an actuator with in the solenoid sleeve for controlling the system pressure in response to a pressure measured by the sensing element.

2. The solenoid pressure transducer of claim 1, wherein the solenoid sleeve material is an annealed metal alloy.

3. The solenoid pressure transducer of claim 2, wherein the material of the solenoid sleeve has a coefficient of thermal expansion approximately equal to the coefficient of thermal expansion of the sensing element.

4. The solenoid pressure transducer of claim 3, wherein the solenoid sleeve material has a coefficient of thermal expansion of $7.4 \times 10^{-6}$ in/in/° F. or less.

5. The solenoid pressure transducer of claim 1, wherein the solenoid sleeve is an annealed deep-drawn sleeve forming a flexible diaphragm at a closed end to which the silicon die is attached.

6. The solenoid pressure transducer of claim 5, wherein the solenoid sleeve is made of a material comprising one of: Inconel 600/601 or Nickel 200/201.

7. The solenoid pressure transducer of claim 6, wherein the solenoid sleeve is deep-drawn and annealed.

8. The solenoid pressure transducer of claim 1, wherein the solenoid sleeve has a closed end and the sensing element is attached to the closed end.

9. The solenoid pressure transducer of claim 1, wherein the silicone die is piezoresistive.

10. The solenoid pressure transducer of claim 1, wherein the actuator includes an armature mounted within the solenoid sleeve.

11. The solenoid pressure transducer of claim 1, wherein the transducer has a common set of electrical connectors for the actuator and sensing element.

12. A pressure controller for controlling pressure of a fluid, comprising:

a deep-drawn solenoid sleeve of a nonmagnetic material having an opening in fluid communication with a source of the fluid and forming a pressure chamber, the sleeve having a flexible closed end which acts as a diaphragm in which strain is induced by the pressure of the fluid in the pressure chamber;

a sensing element comprising a silicon die attached to the closed end of the sleeve for measuring the strain in the closed end;

a vitreous glass bond attaching the silicon die to the closed end of the sleeve;

a valve, positioned between the source of the fluid and the pressure chamber, movable between an open position in which the pressure chamber is in fluid communication with the source of the fluid and a closed position in which the pressure chamber is isolated from the source of the fluid; and an actuator responsive to an output of the sensing element for controlling movement of the valve between the open and closed positions.

* * * * *